(12) United States Patent
Akimoto et al.

(10) Patent No.: US 8,309,253 B2
(45) Date of Patent: Nov. 13, 2012

(54) TITANIUM OXIDE, METHOD FOR MANUFACTURING THE SAME, AND LITHIUM SECONDARY BATTERY USING THE SAME AS ACTIVE MATERIAL

(75) Inventors: Junji Akimoto, Tsukuba (JP); Norihito Kijima, Tsukuba (JP); Hiroshi Hayakawa, Tsukuba (JP); Yasuhiko Takahashi, Tsukuba (JP); Yasushi Idemoto, Noda (JP)

(73) Assignee: National Institute of Advanced Industrial Science and Technology (JP)

( * ) Notice: Subject to any disclaimer, the term of this patent is extended or adjusted under 35 U.S.C. 154(b) by 450 days.

(21) Appl. No.: 12/530,035

(22) PCT Filed: Mar. 5, 2008

(86) PCT No.: PCT/JP2008/053979
§ 371 (c)(1),
(2), (4) Date: Sep. 21, 2009

(87) PCT Pub. No.: WO2008/111465
PCT Pub. Date: Sep. 18, 2008

(65) Prior Publication Data
US 2010/0068625 A1 Mar. 18, 2010

(30) Foreign Application Priority Data

Mar. 13, 2007 (JP) .................................. 2007-062901
Feb. 21, 2008 (JP) .................................. 2008-039820

(51) Int. Cl.
*H01M 4/13* (2010.01)
(52) U.S. Cl. .................................... 429/231.5; 424/608
(58) Field of Classification Search ............... 429/231.5; 424/608
See application file for complete search history.

(56) References Cited

FOREIGN PATENT DOCUMENTS
JP   A-2008-117625   5/2008

OTHER PUBLICATIONS

Office Action dated Feb. 17, 2011 issued in counterpart Chinese Patent Application No. 200880007776.9 with English translation (9 pages).
Y.Suzuki et al., "Synthesis and thermal analyses of $TiO_2$-derived nanotubes prepared by the hydrothermal method", J. Mater. Res., vol. 19, No. 4 (2004) pp. 5-8.
International Search Report and Written Opinion mailed Apr. 1, 2008 in corresponding PCT International Application No. PCT/JP2008/053979.
A. Le Bail et al., "Crystal Structure and Thermal Behaviour of $H_2Ti_3O_7$: A New Defective Ramsdellite Form From $Li^+/H^+$ Exchange on $Li_2Ti_3O_7$," Materials Research Bulletin, 1992, vol. 27, pp. 75-85.
Derek J.D. Corcoran et al., "Hydrogen Titanates as Potential Proton Conducting Fuel Cell Electrolytes," Solid State Ionics, 2000, vol. 136-137, pp. 297-303.
Hyun-Su Kim et al., "High $H_2$ Sensing Performance in Hydrogen Trititanate-Derived $TiO_2$," Sensors and Actuators B, 2006, vol. 120, pp. 63-68.
L. Brohan et al., "Physical Properties of Bronze $M_xTiO_2(B)$", Solid State Ionics, 9-10, pp. 419-424 (1983), North Holland Publishing Company, with an English language abstract thereof (7 pages).
A.R. Armstrong et al., "Lithium-Ion Intercalation into $TiO_2$-B Nanowires", Advanced Materials, vol. 17, No. 7, pp. 862-865 (2005) Wiley-VCH Verlag GmbH & Co., Weinheim.
T.P. Feist et al., "The Soft Chemical Synthesis of $TiO_2$ (B) from Layered Titanates", Journal of Solid State Chemistry, 101, pp. 275-295 (1992) Academic Press, Inc.
Notice of Decision to Grant Patent dated Mar. 31, 2012 in corresponding Korean Patent Application No. 10-2009-7018886 (with English translation).
H. Izawa, et al., "Effect of Intercalated Alkylammonium on Cation Exchange Properties of $H_2Ti_3O_7$," Journal of Solid State Chemistry, vol. 69, Issue 2, pp. 336-342 (1987).
Ning Wang, et al., "Crystalline Transition From $H_2Ti_3O_7$ Nanotubes to Anatase Nanocrystallines Under Low-Temperature Hydrothermal Conditions," Journal of the American Ceramic Society, vol. 89, Issue 11, pp. 3564-3566 (2006).

*Primary Examiner* — Edward Cain
(74) *Attorney, Agent, or Firm* — Ostrolenk Faber LLP

(57) ABSTRACT

The present invention relates to a novel compound characterized by having a one-dimensional tunnel structure and being represented by the chemical formula $H_2Ti_{12}O_{25}$, a method for manufacturing the same, and a lithium secondary battery containing, as a constituent thereof, an electrode produced by using the novel titanium oxide as an active material, and expected to demonstrate superior charge/discharge cycle characteristics over a long period of time as well as high capacity.

11 Claims, 6 Drawing Sheets

TITANIUM OXIDE, METHOD FOR MANUFACTURING THE SAME, AND LITHIUM SECONDARY BATTERY USING THE SAME AS ACTIVE MATERIAL

CROSS-REFERENCE TO RELATED APPLICATIONS

The present application is a 35 U.S.C. §§371 national phase conversion of PCT/JP2008/053979, filed Mar. 5, 2008, which claims priority of Japanese Patent Application Nos. 2007-062901 and 2008-039820, filed Mar. 13, 2007 and Feb. 21, 2008, respectively, the contents of which are incorporated herein by reference. The PCT International Application was published in the Japanese language.

TECHNICAL FIELD

The present invention relates to a novel titanium oxide, a method for manufacturing the same, and a lithium secondary battery including as a constituent thereof, an electrode containing the novel titanium oxide as an active material.

BACKGROUND ART

In recent years, nearly all of the secondary batteries installed in portable electronic devices such as cellular telephones and notebook personal computers are lithium secondary batteries. In addition, lithium secondary batteries are also expected to be used practically in the future as large-scale batteries of hybrid electric vehicles, electrical power load leveling systems and the like, and their importance is continuing to increase.

These lithium secondary batteries have as major constituents thereof, a positive electrode and a negative electrode, each of which contains a material capable of reversibly inserting and extracting lithium ions, and further have a separator containing a non-aqueous electrolyte or solid electrolyte.

Among these constituents, materials that have been examined for use as electrode active materials include oxides such as lithium cobalt oxide ($LiCoO_2$), lithium manganese oxide ($LiMn_2O_4$) and lithium titanium oxide ($Li_4Ti_5O_{12}$), metals such as lithium metal, lithium alloy and tin alloy, and carbon-based materials such as graphite and mesocarbon microbeads (MCMB).

Although the battery voltage is determined according to the difference in chemical potential between these materials at their lithium contents in the respective active materials, there is a possibility to obtain a large potential difference by a combination of these materials in particular, and this is one of the characteristics of lithium secondary batteries having superior energy density.

In particular, a combination of a lithium cobalt oxide ($LiCoO_2$) active material and a carbon material which are used for electrodes enables a voltage of nearly 4 V while the combination realizes a large charge/discharge capacity, which corresponds to the amount of lithium able to be extracted from and inserted into an electrode, and the combination also results in a higher degree of safety. Therefore, the combination of these electrode materials is widely used in current lithium secondary batteries.

On the other hand, when combining electrodes containing a spinel-type lithium manganese oxide ($LiMn_2O_4$) active material and a spinel-type lithium titanium oxide ($Li_4Ti_5O_{12}$) active material, the lithium insertion-extraction reaction tends to occur smoothly and there are fewer changes in crystal lattice volume accompanying the reaction. Therefore, it has been identified that the resulting lithium secondary battery can have a superior long-term charge/discharge cycle properties, and such a lithium secondary battery is developed for practical use.

Since chemical batteries such as lithium secondary batteries and capacitors are expected to be required to have larger size and longer life for use as electric vehicle power supplies, large-capacity backup power supplies and emergency power supplies, electrode active materials offering even higher performance (higher capacity) have come to be required by combining oxide active materials like those described above.

Among these, since titanium oxide-based active materials exhibits a voltage of about 1 to 2 V in the case of using lithium metal for the counter electrode, studies have been conducted on materials having various crystal structures regarding their potential for use as electrode active materials in negative electrode materials.

In particular, titanium dioxide active materials having a titanate bronze type crystal structure (in the present description, titanium oxides having a titanate bronze type crystal structure are abbreviated as $TiO_2(B)$), which can achieve a smooth lithium insertion/extraction reaction comparable to that of spinel-type lithium titanium oxide while realizing a higher capacity than spinel types, are attracting attention as electrode materials (see Patent Document 1 and Non-Patent Document 1).

Among these, a process for producing $TiO_2(B)$ has been clearly determined in which $H_2Ti_3O_7$ is used as a starting material, and has been clearly demonstrated to enable the synthesis of an electrode material having $TiO_2(B)$ as a main component thereof by heating in air at a temperature of 280° C. or higher.

In addition, nano-scale $TiO_2(B)$ active materials in the form of nanowires, nanotubes and the like are attracting attention as electrode materials capable of having an initial discharge capacity of more than 300 mAh/g (see Non-Patent Document 2).

However, these materials having a nano-sized particle diameter have a large irreversible capacity since a portion of lithium ions inserted by the initial insertion reaction are unable to be extracted. As a result, an initial charge/discharge efficiency (=charging capacity (amount of extracted lithium)÷ discharge capacity (amount of inserted lithium)) becomes about 73%, and this causes a problem for use as a negative electrode material in high-capacity lithium secondary batteries.

On the other hand, it has been reported that metastable phases exist during the course of a heat-treating process until the formation of $TiO_2(B)$ when using $H_2Ti_3O_7$ as a starting material (see Non-Patent Document 3).

Among these, it has been reported that a phase having a chemical composition of $H_2Ti_6O_{13}$ and a $Na_2Ti_6O_{13}$ type framework structure exists after a heat treatment in air for one month at 140° C.; however, it has not been clearly determined what types of phases are present within a temperature range from more than 150° C. to a temperature of 280° C. at which $TiO_2(B)$ is formed.

In addition, with regard to crystal phases produced by heating $H_2Ti_3O_7$ within a range of 150 to 280° C., there have also been no disclosures regarding the application of the produced crystal phases to electrode active materials.

Patent Document 1: Japanese Patent Application No. 2006-299477

Non-Patent Document 1: L. Brohan, R. Marchand, Solid State Ionics, 9-10, 419-424 (1983)

Non-Patent Document 2: A. R. Armstrong, G. Armstrong, J. Canales, R. Garcia, P. G. Bruce, Advanced Materials, 17, 862-865 (2005)

Non-Patent Document 3: T. P. Feist, P. K. Davies, J. Solid State Chem., 101, 275-295 (1992)

DISCLOSURE OF THE INVENTION

Problems to be Solved by the Invention

An object of the present invention is to solve the current problems described above and to provide a novel titanium oxide that is important as a lithium secondary battery electrode material expected to demonstrate superior long-term charge/discharge cycle properties and a high capacity, a production process thereof, and a lithium secondary battery containing as a constituent thereof, an electrode in which the novel titanium oxide is used as an active material.

Means for Solving the Problems

As a result of conducting extensive studies, the inventors of the present invention found that a novel compound represented by the formula $H_2Ti_{12}O_{25}$ is formed by using $H_2Ti_3O_7$ as the starting material and heating the starting material in air within a temperature range of 150° C. to less than 280° C., and identified the chemical composition, the crystal structure and the production process of the novel $H_2Ti_{12}O_{25}$ compound. Furthermore, the inventors of the present invention prepared a lithium secondary battery containing as a constituent thereof, an electrode in which the novel $H_2Ti_{12}O_{25}$ compound was used as an active material, and it could be confirmed that the prepared lithium secondary battery exhibited high-capacity initial charge/discharge properties. As a result, the present invention could be completed.

Namely, as indicated below, the present invention provides a novel titanium oxide compound represented by the formula $H_2Ti_{12}O_{25}$, a production process thereof, and a lithium secondary battery containing as a constituent thereof, an electrode that uses the novel $H_2Ti_{12}O_{25}$ compound as an active material.

1. A compound having a chemical composition represented by the general formula $H_2Ti_{12}O_{25}$.
2. A compound having a chemical composition represented by the general formula $H_2Ti_{12}O_{25}$, and having a one-dimensional tunnel structure as a characteristic of the crystal structure thereof.
3. A compound having a chemical composition represented by the general formula $H_2Ti_{12}O_{25}$, and having a one-dimensional tunnel structure as a characteristic of the crystal structure thereof, wherein the crystal structure exhibits a monoclinic crystal system with a space group of P2/m and lattice parameters of a=14.81 to 14.83 Å, b=3.88 to 3.90 Å, c=9.85 to 9.88 Å, and β=110 to 112°.
4. An active material for a lithium secondary battery which is produced from a compound having a chemical composition represented by the general formula $H_2Ti_{12}O_{25}$.
5. A method for manufacturing the compound described in any one of 1 to 3 above, which includes: synthesizing the compound by heat-treating a $H_2Ti_3O_7$ compound which is a starting material in air or in a vacuum within a temperature range of 150° C. to less than 280° C.
6. The method for manufacturing the compound according to 5 above, wherein the $H_2Ti_3O_7$ compound is synthesized by subjecting sodium titanium oxide polycrystallines represented by the formula $Na_2Ti_3O_7$ which are formed by treating a mixture of a sodium compound and titanium oxide in air at a high temperature of 600° C. or higher, to a proton exchange reaction in air under room temperature conditions using an acidic solution.

7. A method for manufacturing the active material for a lithium secondary battery described in 4 above, which includes: synthesizing the active material by heat-treating a $H_2Ti_3O_7$ compound which is a starting material in air or in a vacuum within a temperature range of 150° C. to less than 280° C.

8. The method for manufacturing the active material for a lithium secondary battery according to 7 above, wherein the $H_2Ti_3O_7$ compound is synthesized by subjecting sodium titanium oxide polycrystallines represented by the formula $Na_2Ti_3O_7$ which are formed by treating a mixture of a sodium compound and titanium oxide in air at a high temperature of 600° C. or higher, to a proton exchange reaction in air under room temperature conditions using an acidic solution.

9. A lithium secondary battery which includes: two electrodes used as a positive electrode and a negative electrode and an electrolyte, wherein the electrode contains the active material described in claim 4, and is used as a constituent thereof.

Effects of the Invention

According to the present invention, a novel titanium oxide represented by the formula $H_2Ti_{12}O_{25}$ can be produced, and a lithium secondary battery can be realized having superior properties by using this novel compound as an active material of the electrode material.

BRIEF DESCRIPTION OF THE REFERENCE SYMBOLS

Figure 1:
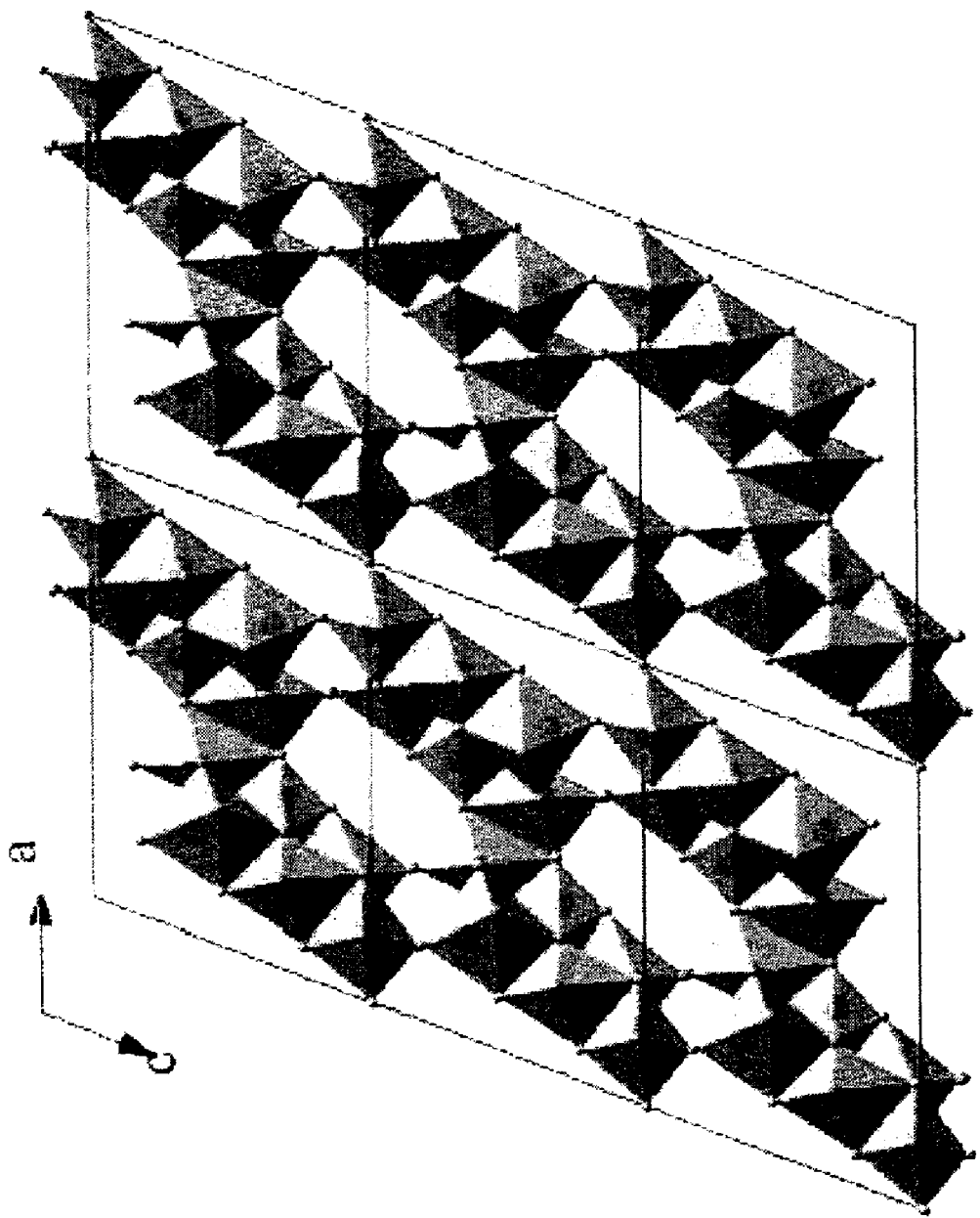
FIG. 1 is a schematic drawing showing the crystal structure of the $H_2Ti_{12}O_{25}$ compound of the present invention.

1 Coin-type lithium secondary battery
2 Negative electrode terminal
3 Negative electrode
4 Separator+electrolyte
5 Insulating packing
6 Positive electrode
7 Positive electrode can

BEST MODE FOR CARRYING OUT THE INVENTION

The novel titanium oxide $H_2Ti_{12}O_{25}$ of the present invention is a compound having a one-dimensional tunnel structure as a characteristic of the crystal structure thereof.

In addition, the one-dimensional tunnel structure of the $H_2Ti_{12}O_{25}$ compound exhibits a monoclinic crystal system with a space group of P2/m and lattice parameters of a=14.81 to 14.83 Å, b=3.88 to 3.90 Å, c=9.85 to 9.88 Å, and β=110 to 112°.

Moreover, the novel $H_2Ti_{12}O_{25}$ compound can be used as an active material of an electrode material for a lithium secondary battery.

The method for manufacturing the $H_2Ti_{12}O_{25}$ compound of the present invention is a process in which $H_2Ti_{12}O_{25}$ is synthesized by heat-treating polycrystallines of $H_2Ti_3O_7$ which are the starting material in air within a temperature range of 150 to 280° C. In addition, the method for synthesizing the polycrystallines of $H_2Ti_3O_7$ which are to be used as the starting material is a process which includes treating a mixture of a sodium compound and titanium oxide in air at a high temperature of 600° C. or higher to form sodium titanium oxide polycrystallines represented by the formula $Na_2Ti_3O_7$, and then subjecting the formed sodium titanium oxide polycrystallines to a proton exchange reaction in air under room temperature conditions using an acidic solution.

In addition, a lithium secondary battery using as a constituent thereof, an electrode containing the $H_2Ti_{12}O_{25}$ compound of the present invention as an active material enables a high-capacity and reversible lithium insertion/extraction reaction, and can also be expected to realize a high reliability.

As shown in FIG. 1, the one-dimensional tunnel structure of the novel titanium oxide $H_2Ti_{12}O_{25}$ of the present invention is a crystal structure having two types of tunnel spaces with different sizes which result from a framework structure constructed by linked $TiO_6$ octahedral molecules. As a result of employing this crystal structure, a large amount of lithium ions can be inserted within the tunnels, and one-dimensional conductive paths are also formed. Therefore, ions move easily in the direction of the tunnels.

The following provides a detailed explanation of the production process according to the present invention.

(Synthesis of Starting Material $Na_2Ti_3O_7$ Polycrystallines)

The $Na_2Ti_3O_7$ polycrystallines which are to be used as the starting material in the present invention can be produced by weighing and mixing raw materials of at least one type of sodium compound and at least one type of titanium oxide to obtain the chemical composition of $Na_2Ti_3O_7$, and then heating the mixed raw materials in an atmosphere containing oxygen gas such as air.

At least one type selected from sodium (metal sodium) and sodium compounds is used as the sodium raw material. There are no particular limitations on the sodium compound, provided that it contains sodium, and examples thereof include oxides such as $Na_2O$ and $Na_2O_2$, salts such as $Na_2CO_3$ and $NaNO_3$, and hydroxides such as NaOH. Among these, $Na_2CO_3$ is particularly preferable.

At least one type selected from titanium (metal titanium) and titanium compounds is used as the titanium raw material. There are no particular limitations on the titanium compound, provided that it contains titanium, and examples thereof include oxides such as TiO, $Ti_2O_3$ and $TiO_2$ and salts such as $TiCl_4$. Among these, $TiO_2$ is particularly preferable.

To begin with, a mixture containing these raw materials is prepared. The sodium raw material and the titanium raw material are preferably mixed such that the mixing ratio thereof corresponds to the chemical composition of $Na_2Ti_3O_7$. In addition, since sodium is easily volatilized during heating, the sodium raw material should be charged such that the relative proportion of sodium becomes slightly more than the elemental ratio of 2 in the aforementioned chemical formula, and the relative proportion of sodium is preferably set within a range of 2.0 to 2.1. In addition, there are no particular limitations on the mixing method, provided that the raw materials can be uniformly mixed, and the raw materials may be mixed by, for example, a wet method or a dry method using a conventional mixing machine such as a mixer.

Next, the mixture is subjected to heating. Although the heating temperature can be suitably set according to the raw materials, it is normally set within a range of about 600 to 1200° C. and is preferably set within a range of 700 to 1050° C. In addition, there are no particular limitations on the heating atmosphere, and the heating is normally carried out in an oxidizing atmosphere or air. The heating time can be suitably changed according to the heating temperature and the like. Although there are also no particular limitations on the cooling method, cooling is normally carried out by spontaneous cooling (in-furnace cooling) or slow cooling.

After heating, the heated product may be crushed by a conventional method as necessary, and the heating step described above may further be conducted again. Namely, in the process of the present invention, the aforementioned step of subjecting the mixture to heating, cooling and crushing is preferably repeated two or more times. Furthermore, the degree of crushing is suitably adjusted according to the heating temperature and the like.

(Production of Precursor $H_2Ti_3O_7$ Polycrystallines)

Next, $H_2Ti_3O_7$ polycrystallines, in which all or a portion of the sodium are replaced with protons, are obtained by using as a starting material, the $Na_2Ti_3O_7$ compound obtained as described above and subjecting the starting material to a proton exchange reaction using an acidic solution.

In this case, it is preferable that the crushed $Na_2Ti_3O_7$ compound is dispersed in the acidic solution and is retained therein for a fixed amount of time, and then the product is dried. Examples of acids to be used include hydrochloric acid, sulfuric acid and nitric acid having an arbitrary concentration, and an aqueous solution containing one or more types selected from these acids is suitably used. Among these, dilute hydrochloric acid having a concentration of 0.1 to 1.0 N is preferably used. The treatment time is within a range of 10 hours to 10 days, and is preferably within a range of 1 to 7 days. In addition, it is preferable to suitably replace the solution with a fresh solution so as to shorten the treatment time. Although a conventional drying method can be applied for the drying, vacuum drying is preferable.

With regard to the $H_2Ti_3O_7$ polycrystallines obtained in this manner, by optimizing the conditions of the proton exchange treatment, the amount of remaining sodium derived from the starting material can be reduced to not more than the detection limit of a wet chemical analysis method.

(Production of Novel Titanium Oxide $H_2Ti_{12}O_{25}$)

The target novel titanium oxide $H_2Ti_{12}O_{25}$ is obtained by using as a starting material, the $H_2Ti_3O_7$ polycrystallines obtained as described above and heat-treating the starting material in air while accompanying thermal degradation of $H_2O$.

In this case, the temperature of the heat treatment is within a range of 150 to 280° C. and is preferably within a range of 200 to 270° C. The treatment time is normally within a range of 0.5 to 10 hours and is preferably within a range of 1 to 20 hours, and the higher the heat treatment temperature is, the shorter the treatment time can be.

(Lithium Secondary Battery)

In the lithium secondary battery of the present invention, an electrode containing the aforementioned $H_2Ti_{12}O_{25}$ as an active material is used as a constituent thereof. Namely, battery elements of conventional lithium secondary batteries (such as those of the coin type, button type, cylindrical type and all solid-state type) can be used without modification with the exception of using the $H_2Ti_{12}O_{25}$ compound of the present invention as the active material of the electrode material.

Figure 2:
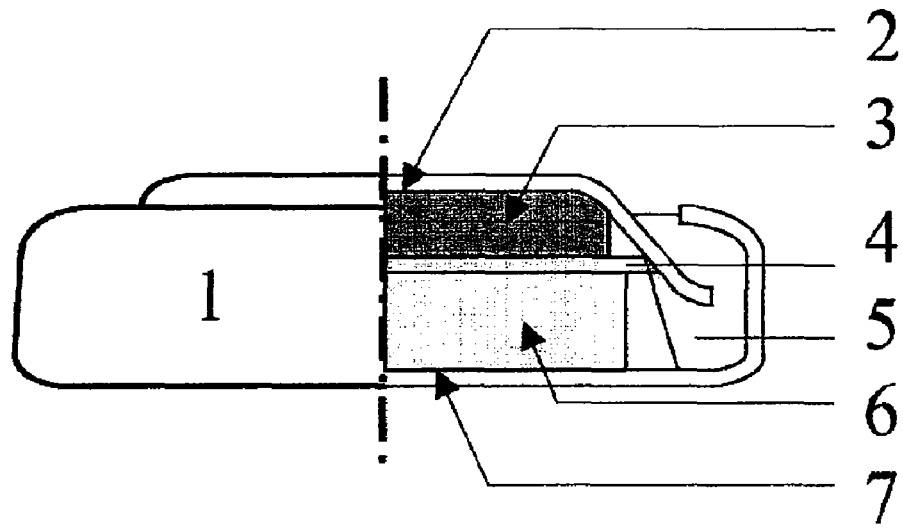
FIG. 2 is a schematic drawing showing an example of a lithium secondary battery.

FIG. 2 is a schematic drawing showing an example of applying the lithium secondary battery of the present invention to a coin-type battery. This coin-type battery 1 includes a negative electrode terminal 2, a negative electrode 3, a separator+electrolyte 4, an insulating packing 5, a positive electrode 6, and a positive electrode can 7.

In the present invention, an electrode composite is prepared by mixing an electrical conducting material, a binder and the like with the aforementioned $H_2Ti_{12}O_{25}$ active material of the present invention as necessary, and then the electrode composite is subjected to pressure bonding to a current collector to produce an electrode. Stainless steel mesh, aluminum foil or the like can be preferably used as the current collector. Acetylene black, Ketchen black or the like can be preferably used as the electrical conducting material. Tetrafluoroethylene, polyvinylidene fluoride or the like can be preferably used as the binder.

Although there are no particular limitations on blending the $H_2Ti_{12}O_{25}$ active material, the electrical conducting material, the binder and the like to prepare the electrode composite, normally the blending is conducted to obtain the electrode composite which includes the electrical conducting material at an amount of about 1 to 30% by weight (and preferably 5 to 25% by weight), and the binder at an amount of 0 to 30% by weight (and preferably 3 to 10% by weight), with the remainder being the $H_2Ti_{12}O_{25}$ active material.

In the lithium secondary battery of the present invention, a conventional substance that functions as a negative electrode and occludes lithium such as lithium metal or lithium alloy can be used for a counter electrode for the aforementioned electrode. Alternatively, a conventional substance that functions as a positive electrode and occludes lithium such as lithium cobalt oxide ($LiCoO_2$) or spinel-type lithium manganese oxide ($LiMn_2O_4$) can also be used for the counter electrode. Namely, the electrode containing the active material of the present invention can function as a positive electrode or a negative electrode depending on the constituent materials of the combined counter electrode.

In addition, conventional battery elements for a separator, a battery container and the like may be employed in the lithium secondary battery of the present invention.

Moreover, a conventional liquid electrolyte, a solid electrolyte or the like can be used as an electrolyte. As the liquid electrolytes, a solution can be used in which an electrolyte such as lithium perchlorate or lithium hexafluorophosphate is dissolved in a solvent such as ethylene carbonate (EC), dimethyl carbonate (DMC), propylene carbonate (PC) or diethyl carbonate (DEC).

The following indicates examples thereof so as to further clarify the characteristics of the present invention. The present invention is not limited to these examples.

EXAMPLE 1

Production of Starting Material $Na_2Ti_3O_7$ Polycrystallines

Sodium carbonate ($Na_2CO_3$) powder having a purity of 99% or more and titanium dioxide ($TiO_2$) powder having a purity of 99.99% or more were weighed to a molar ratio of Na:Ti of 2:3. They were mixed in a mortar and then were filled into a JIS standard platinum crucible. Thereafter, the materials were heated in air under high-temperature conditions in an electric furnace. The heating temperature was 800° C., and the heating time was 20 hours. Subsequently, after allowing to spontaneously cooling in the electric furnace, the materials were again crushed and mixed in a mortar, and then the materials were again heated for 20 hours at 800° C. Thereby, a starting material in the form of $Na_2Ti_3O_7$ polycrystallines was obtained.

When the chemical composition of the resulting sample was analyzed by ICP emission spectrometry (trade name: ICPS-7500, Shimadzu Corp.), the result of analysis showed that Na:Ti=1.99:3.00 (analytical error for each element: within 0.04), and it was considered proper that the chemical composition of the sample was represented by the chemical formula of $Na_2Ti_3O_7$. Moreover, it was confirmed that the sample consisted of a single phase which exhibited a monoclinic crystal system with a space group of P2/m and had satisfactory crystallinity as determined with an X-ray diffraction analyzer (trade name: RINT2550V, Rigaku Corp.). In addition, when lattice parameters were determined by the least squares method using the respective indices and interplanar spacings, the values indicated below were obtained, and these values closely coincided with known values for $Na_2Ti_3O_7$:

a=9.131 Å (error: within 0.001 Å);
b=3.804 Å (error: within 0.001 Å);
c=8.569 Å (error: within 0.001 Å); and
β=101.60° (error: within 0.01°).

(Production of Precursor $H_2Ti_3O_7$ Polycrystallines)

The crushed powder of the $Na_2Ti_3O_7$ polycrystallines synthesized as described above was used as the starting material, and the starting material was subjected to a proton exchange reaction by immersing the starting material in 0.5 N of hydrochloric acid solution and holding for 5 days under room temperature conditions. The solution was replaced every 12 hours in order to accelerate the exchange treatment rate. Subsequently, the resulting material was rinsed with water and was dried for 24 hours in a vacuum at 120° C. to obtain a precursor in the form proton-exchanged $H_2Ti_3O_7$ polycrystallines.

When the chemical composition of the resulting sample was analyzed by ICP emission spectrometry, no sodium was detected, and it was considered proper that the chemical composition of the sample was represented by $H_2Ti_3O_7$ in which sodium ions had been nearly completely replaced with protons. Moreover, it was confirmed that the sample consisted of a single phase of $H_2Ti_3O_7$ which exhibited a monoclinic crystal system with a space group of C2/m and had satisfactory crystallinity as determined with an X-ray diffraction analyzer. In addition, when lattice parameters were determined by the least squares method using the respective indices and interplanar spacings, the values indicated below were obtained, and these values closely coincided with known values for $H_2Ti_3O_7$:

a=16.032 Å (error: within 0.001 Å);
b=3.751 Å (error: within 0.001 Å);
c=9.194 Å (error: within 0.001 Å); and
β=101.44° (error: within) 0.01°.

When the grain morphology of the thus obtained precursor $H_2Ti_3O_7$ polycrystallines was investigated with a scanning electron microscope (SEM) (trade name: JSM-5400, JEOL, Ltd.), it was confirmed that the polycrystallines maintained the morphology of the starting material $Na_2Ti_3O_7$, and the polycrystallines were composed of primary particles which had an isotropic shape measuring about 1 micron on a side.

(Production of Novel Titanium Oxide $H_2Ti_{12}O_{25}$)

Next, the resulting precursor $H_2Ti_3O_7$ polycrystallines were heat-treated in air for 5 hours at 260° C. to obtain the target $H_2Ti_{12}O_{25}$.

Figure 3:
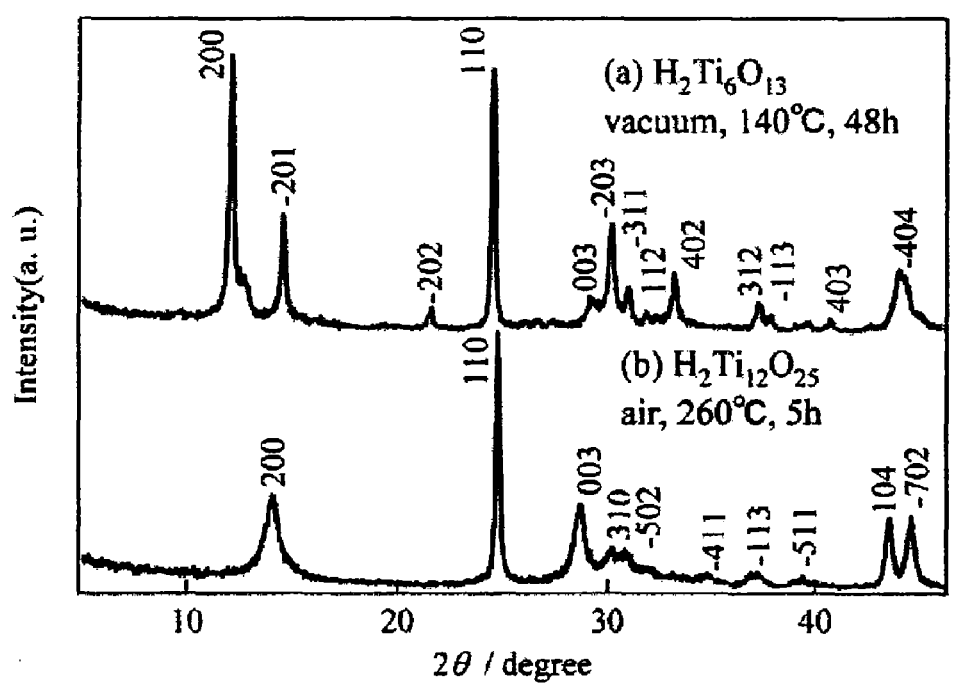
FIG. 3 shows X-ray powder diffraction patterns of the $H_2Ti_{12}O_{25}$ compound of the present invention obtained in Example 1 and the $H_2Ti_6O_{13}$ compound obtained in Comparative Example 1.

With regard to the resulting sample, X-ray diffraction data were measured with an X-ray diffraction analyzer; thereby, it could be clearly explained that the crystal structure of the sample was identified as a structural model classified into a monoclinic crystal system with a space group of P2/m and having satisfactory crystallinity. The powder X-ray diffraction pattern obtained at this time is shown in FIG. 3(b). In addition, when lattice parameters were determined by the least squares method using the respective indices and interplanar spacings, the values indicated below were obtained. These values did not coincide with those of known compounds, and therefore, it was clearly considered that the sample was a novel substance:

a=14.82 Å (error: within 0.01 Å);
b=3.890 Å (error: within 0.001 Å);
c=9.866 Å (error: within 0.008 Å); and
β=111.06° (error: within 0.08°).

In addition, with respect to the validity of the chemical composition, a weight loss of 1.6% by weight was confirmed during heating to 600° C. as a result of thermogravimetric analysis (TGA) (MacScience Corp.). This result could be explained with the decomposition reaction indicated below (calculated value: 1.8% by weight); thereby, it was confirmed proper that the chemical composition of the sample was represented by the chemical formula of $H_2Ti_{12}O_{25}$.

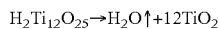

$$H_2Ti_{12}O_{25} \rightarrow H_2O\uparrow + 12TiO_2$$

Figure 4:
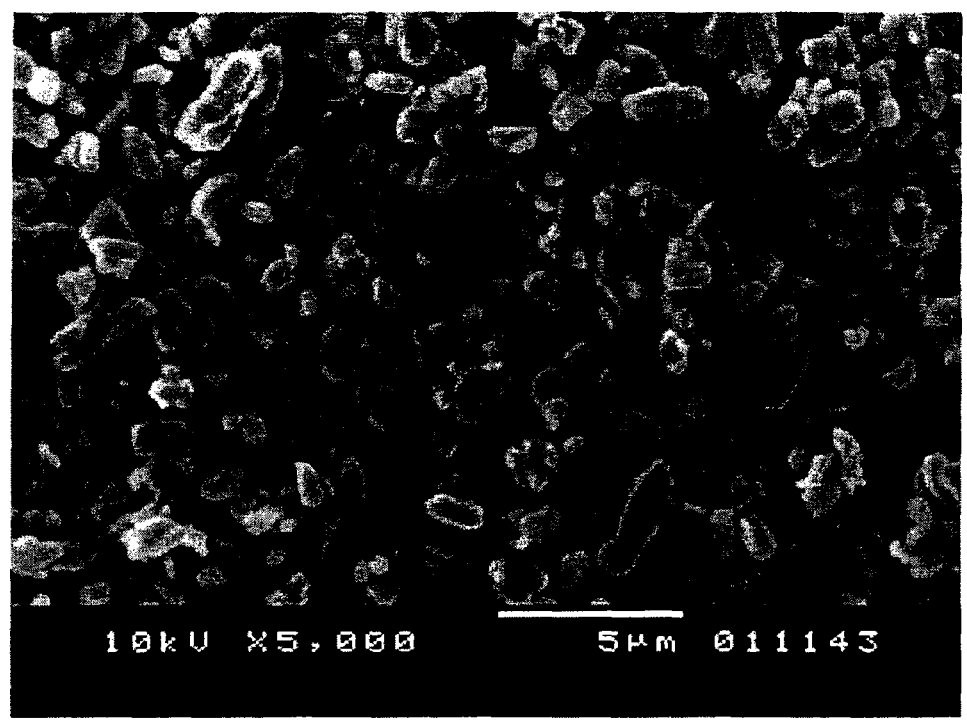
FIG. 4 is a scanning electron micrograph showing the grain morphology of the $H_2Ti_{12}O_{25}$ compound of the present invention obtained in Example 1.

When the grain morphology of the $H_2Ti_{12}O_{25}$ obtained in this manner was investigated with a scanning electron microscope (SEM), it was confirmed that the morphology of the starting material in the form of $Na_2Ti_3O_7$ and the precursor in the form of $H_2Ti_3O_7$ was maintained, and the sample was composed of primary particles which had an isotropic shape measuring about 1 micron on a side (FIG. 4).

Moreover, when the crystal structure was analyzed by powder X-ray structural analysis (using the program RIETAN 2000) using intensity data measured with a powder X-ray diffraction analyzer, it was confirmed that the crystal structure had a one-dimensional tunnel structure resulting from a similar framework structure as sodium titanium oxide $Na_2Ti_{12}O_{25}$ which is a known substance.

In addition, the crystal structure that was clearly determined by analysis is shown in FIG. 1. It was confirmed that two types of tunnel spaces with different sizes were formed by a framework structure constructed by linked $TiO_6$ octahedral units.

(Lithium Secondary Battery)

The $H_2Ti_3O_7$ compound obtained in this manner was used as an active material, and the active material, an electrical conducting material in the form of acetylene black, and a binder in the form of tetrafluoroethylene were blended at a weight ratio of 80:15:5 to prepare an electrode. Lithium metal was used as a counter electrode, and a 1 M of solution of lithium hexafluorophosphate dissolved in a mixed solvent of ethylene carbonate (EC) and diethyl carbonate (DEC) (volume ratio=1:1) was used as a liquid electrolyte. A lithium secondary battery (coin-type cell) having the structure shown in FIG. 2 was produced using these battery elements, and then the electrochemical lithium insertion/extraction behavior thereof was measured electrochemically. The battery was produced in accordance with a conventional cell composition and assembling method.

Figure 5:
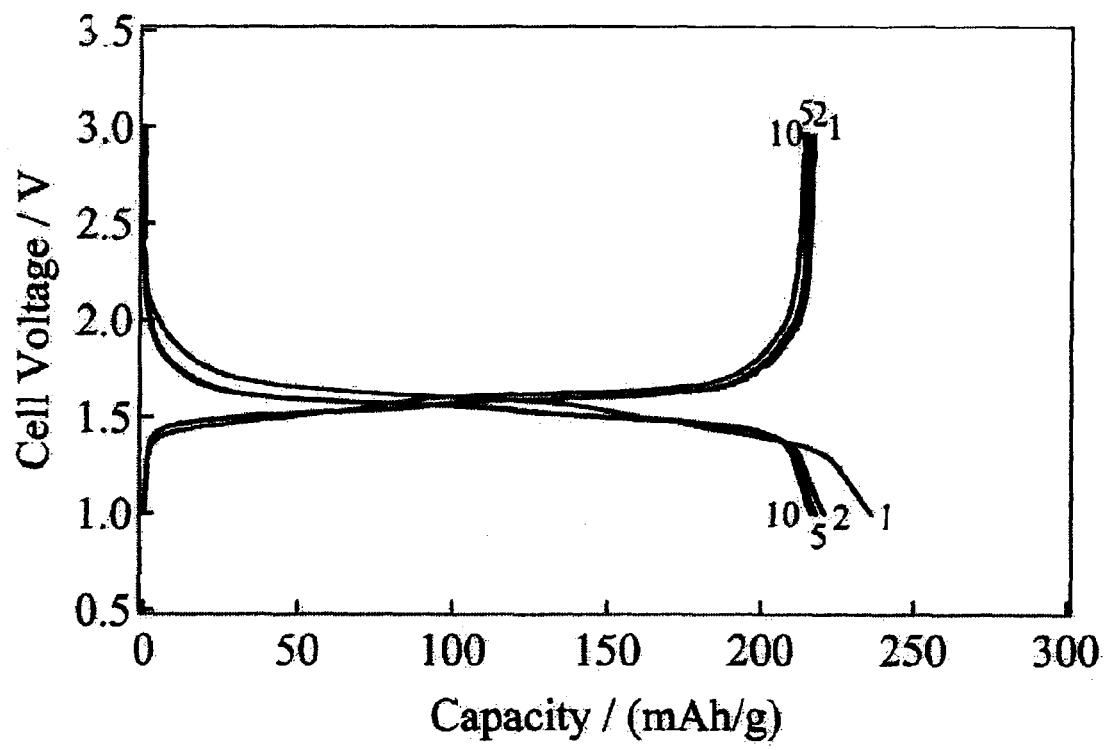
FIG. 5 is a graph showing changes in voltage accompanying a lithium insertion/extraction reaction of a battery of which the electrode is produced by using the $H_2Ti_{12}O_{25}$ compound of the present invention obtained in Example 1 as an active material.

When the resulting lithium secondary battery was subjected to an electrochemical lithium insertion/extraction test under a temperature condition of 25° C. at a current density of 10 mA/g within cutoff potentials of 3.0 V and 1.0 V, a voltage plateau was observed at or in the vicinity of 1.6 V; thereby, it was confirmed that reversible lithium insertion and extraction could be conducted. Changes in voltage accompanying the lithium insertion/extraction reaction are shown in FIG. 5. The amount of inserted lithium was equivalent to 8.60 per chemical formula of $H_2Ti_{12}O_{25}$, and the initial insertion and extraction capacities per unit weight of active material were 236 mAh/g and 214 mAh/g, respectively. On the basis of these findings, the initial charge/discharge efficiency was determined to be 90% or more, and it was confirmed that a discharge capacity of 215 mAh/g could be maintained even after 10 cycles. On the basis of the above, it was confirmed that the $H_2Ti_{12}O_{25}$ active material of the present invention could occur a reversible lithium insertion/extraction reaction with a high capacity, and could be promising as an electrode material for a lithium secondary battery.

COMPARATIVE EXAMPLE 1

The precursor $H_2Ti_3O_7$ synthesized in Example 1 was heat-treated for 48 hours at 140° C. which was lower than that when synthesizing $H_2Ti_{12}O_{25}$ in Example 1. Thereby, $H_2Ti_6O_{13}$ was obtained instead of $H_2Ti_{12}O_{25}$.

With regard to the resulting sample, X-ray diffraction data were measured with an X-ray diffraction analyzer; thereby, it could be clearly explained that the crystal structure of the sample was identified as a structural model classified into a monoclinic crystal system with a space group of C2/m and having satisfactory crystallinity. The powder X-ray diffraction pattern obtained at this time is shown in FIG. 3(a). In addition, when lattice parameters were determined by the least squares method using the respective indices and interplanar spacings, the values indicated below were obtained:

a=14.614 Å (error: within 0.002 Å);
b=3.7294 Å (error: within 0.0004 Å);
c=9.232 Å (error: within 0.001 Å); and
β=97.04° (error: within 0.01°).

Figure 6:
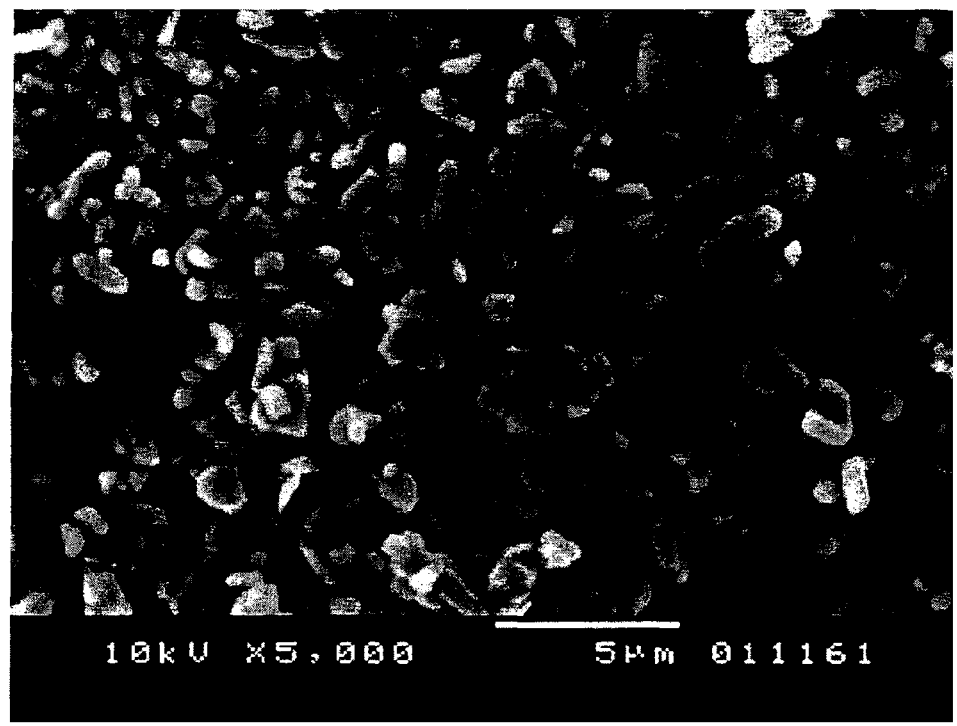
FIG. 6 is a scanning electron micrograph showing the grain morphology of $H_2Ti_6O_{13}$ compound obtained in Comparative Example 1.

When the grain morphology of the $H_2Ti_6O_{13}$ obtained in this manner was investigated with a scanning electron microscope (SEM), it was confirmed that the morphology of the starting material in the form of $Na_2Ti_3O_7$ and the precursor in the form of $H_2Ti_3O_7$ was maintained, and the sample was composed of primary particles which had an isotropic shape measuring about 1 micron on a side (FIG. 6).

In addition, with respect to the validity of the chemical composition, a weight loss of 3.8% by weight was confirmed during heating to 600° C. as a result of thermogravimetric analysis (TGA) (MacScience Corp.). This result could be explained with the decomposition reaction indicated below (calculated value: 3.6% by weight); thereby, it was confirmed proper that the chemical composition of the sample was represented by the chemical formula of $H_2Ti_6O_{13}$.

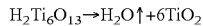

(Lithium Secondary Battery)

Figure 7:
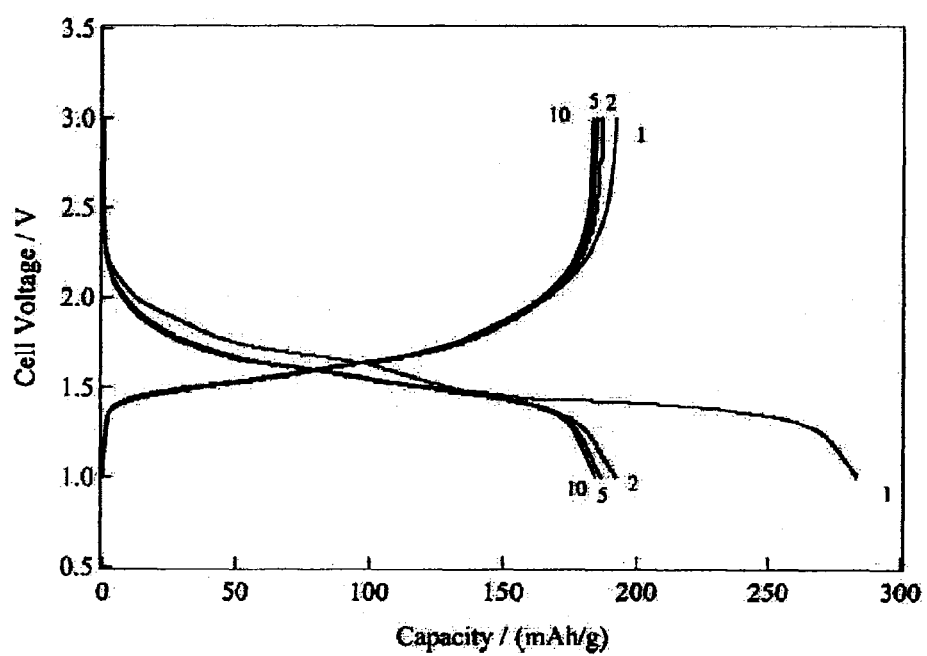
FIG. 7 is a graph showing changes in voltage accompanying a lithium insertion/extraction reaction of a battery of which the electrode is produced by using the $H_2Ti_6O_{13}$ compound obtained in Comparative Example 1 as an active material.

The $H_2Ti_6O_{13}$ obtained in this manner was used as the active material, and then a lithium secondary battery was produced in the same manner as Example 1. When the resulting lithium secondary battery was subjected to an electrochemical lithium insertion/extraction test under the same conditions as Example 1, a voltage plateau was observed at or in the vicinity of 1.6 V; thereby, it was confirmed that reversible lithium insertion and extraction could be conducted. Changes in voltage accompanying the lithium insertion/extraction reaction are shown in FIG. 7. The amount of inserted lithium was equivalent to 5.25 per chemical formula of $H_2Ti_6O_{13}$, and the initial insertion and extraction capacities per unit weight of active material were 283 mAh/g and 192 mAh/g, respectively. On the basis of these findings, the initial charge/discharge efficiency was determined to be 68%, and it was confirmed that, although the initial discharge capacity was greater than that of $H_2Ti_{12}O_{25}$, the irreversible capacity was also large which was problematic. In addition, since the discharge capacity after 10 cycles was only about 190 mAh/g, properties were determined to be inferior in comparison with those of $H_2Ti_{12}O_{25}$.

EXAMPLE 2

Figure 8:
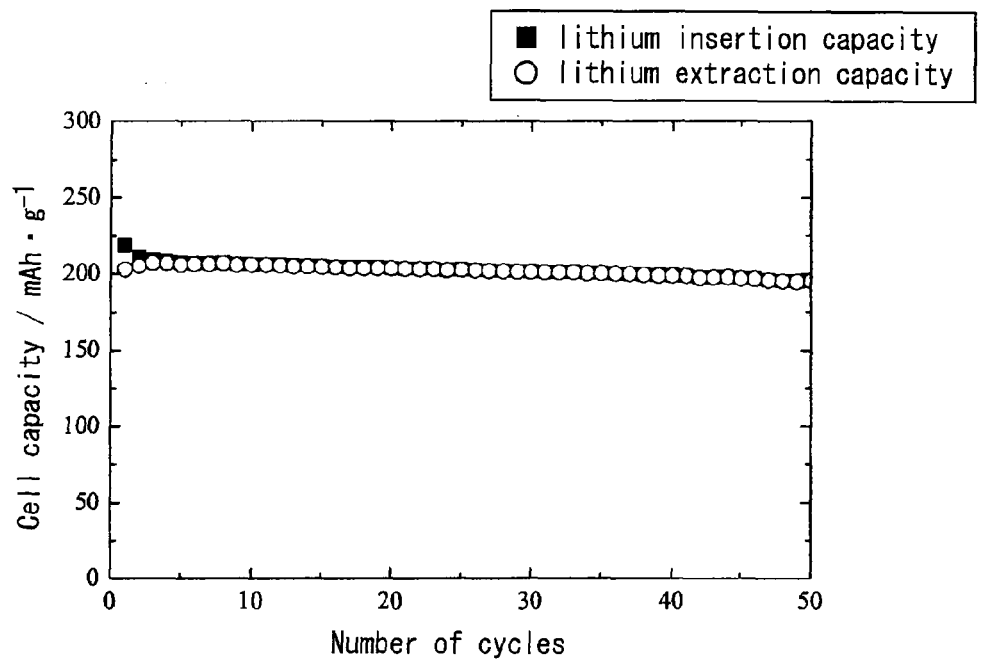
FIG. 8 is a graph showing the results of investigating cycle characteristics up to 50 cycles by carrying out a charge/discharge test on a lithium secondary battery in which the $H_2Ti_{12}O_{25}$ compound of the present invention obtained in Example 1 is used as an active material.

The $H_2Ti_{12}O_{25}$ compound obtained in Example 1 was used as an active material, and a lithium secondary battery was produced using the same constituents as Example 1. The resulting battery was subjected to a charge/discharge test under a temperature condition of 25° C. at a current density of 10 mA/g within cutoff potentials of 3.0 V and 1.0 V. The results of investigating cycle characteristics up to 50 cycles are shown in FIG. 8. A high capacity of 195 mAh/g was maintained even after 50 cycles relative to the initial lithium insertion capacity (219 mAh/g), and it was confirmed that the lithium secondary battery had superior cycle characteristics which demonstrated a capacity retention rate of 89%. On the basis of these findings, it was confirmed that the $H_2Ti_{12}O_{25}$ active material of the present invention could be promising as an electrode material for a lithium secondary battery having a high capacity and a long-life operation.

Figure 9:
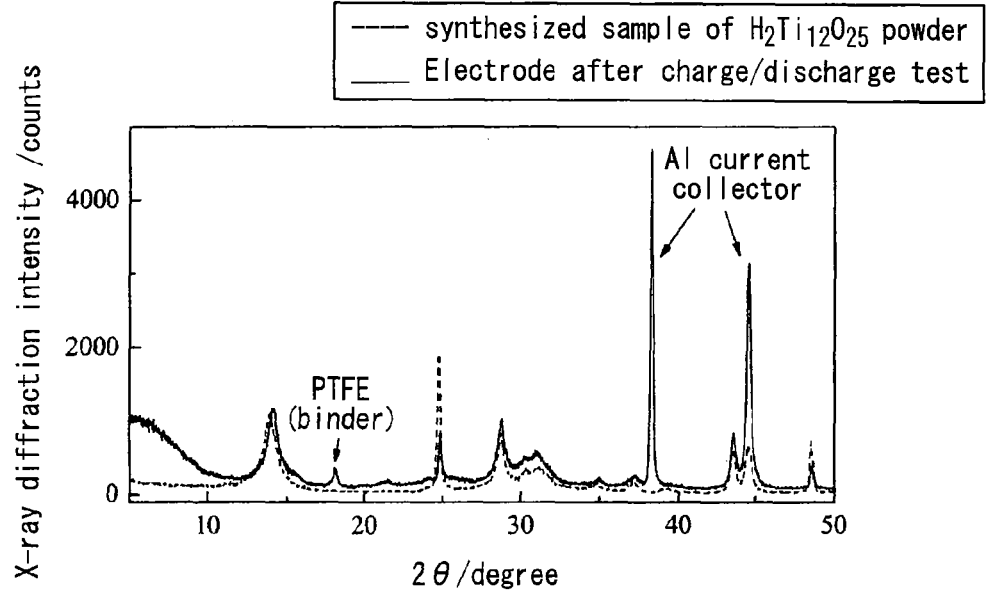
FIG. 9 is a graph showing the results of investigating structural changes of the electrode as determined by X-ray diffraction (XRD) measurement after disassembling the battery after 50 cycles and removing the electrode.
Figure 10:
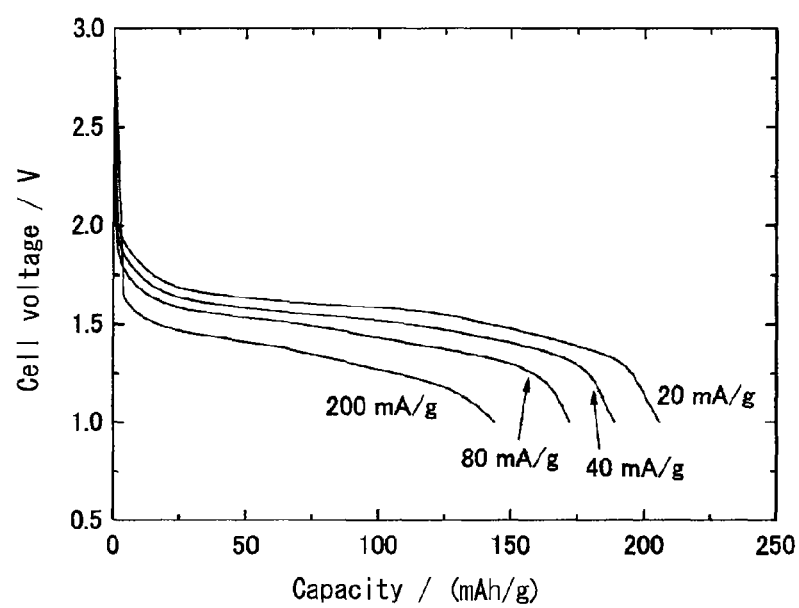
FIG. 10 is a graph showing the results of investigating operation at higher current densities of a lithium secondary battery in which the $H_2Ti_{12}O_{25}$ compound of the present invention obtained in Example 1 is used as an active material.

In addition, the battery after 50 cycles was disassembled, and the electrode was removed. The X-ray diffraction (XRD) pattern of the electrode was measured using the RINT2550 manufactured by Rigaku Corp. to investigate structural changes of the electrode, and the results are shown in FIG. 9. Only peaks corresponding to those of the original $H_2Ti_{12}O_{25}$ compound were observed, and therefore, it was confirmed that no changes in crystal structure occurred before and after the battery reaction. This clearly demonstrated that the $H_2Ti_{12}O_{25}$ active material of the present invention had a stable crystal structure with respect to a lithium insertion/extraction reaction, and could be promising as an electrode material for a lithium secondary battery.

EXAMPLE 3

The $H_2Ti_{12}O_{25}$ compound obtained in Example 1 was used as an active material, and a lithium secondary battery was produced using the same constituents as Example 1. Operations at higher current densities of the resulting battery were investigated under a temperature condition of 25° C. within cutoff potentials of 3.0 V and 1.0 V. As a result, as shown in FIG. 8, it was confirmed that even in cases where the current density was increased to 20, 40 80 and 200 mA/g, high capacities could be maintained. On the basis of these findings, it was presumed that output characteristics suitable for practical use could be easily obtained by optimizing battery production conditions, and therefore, it was confirmed that this active material could to be promising as a practical electrode material having a high capacity and a long-life operation.

INDUSTRIAL APPLICABILITY

Since the novel titanium oxide $H_2Ti_{12}O_{25}$ of the present invention is characterized by having a crystal structure having one-dimensional tunnel spaces, it demonstrates a higher capacity than the current spinel-type $Li_4Ti_5O_{12}$ compound, and it is advantageous for smooth insertion and extraction of lithium. Further, it is a material that demonstrates superior initial charge/discharge efficiency and superior cycle characteristics. Consequently, it has high practical value as an electrode material for a lithium secondary battery.

In addition, since the production process thereof does not require special apparatuses and the used raw materials are inexpensive, high-value-added materials can be produced at low cost.

Moreover, a lithium secondary battery in which the novel titanium oxide $H_2Ti_{12}O_{25}$ of the present invention is applied as an active material enables a reversible lithium insertion/extraction reaction, and can be expected to accommodate charge/discharge cycles over a long period of time and to demonstrate high capacity.

The invention claimed is:

1. A compound having a chemical composition represented by the general formula $H_2Ti_{12}O_{25}$, and having a one-dimensional tunnel structure as a characteristic of a crystal structure thereof,
    wherein the compound consists of a single phase having the crystal structure that exhibits a monoclinic crystal system.

2. The compound according to claim 1,
    wherein the crystal structure exhibits the monoclinic crystal system with a space group of P2/m and lattice parameters of a=14.81 to 14.83 Å, b=3.88 to 3.90 Å, c=9.85 to 9.88 Å, and β=110 to 112°.

3. An active material for a lithium secondary battery which is produced from a compound having a chemical composition represented by the general formula $H_2Ti_{12}O_{25}$, and having a one-dimensional tunnel structure as a characteristic of a crystal structure thereof,
    wherein the compound consists of a single phase having the crystal structure that exhibits a monoclinic crystal system.

4. A method for manufacturing the compound described in claim 1, the method comprising: synthesizing the compound by heat-treating a $H_2Ti_3O_7$ compound which is a starting material in air or in a vacuum within a temperature range of 150° C. to less than 280° C. for 1 to 20 hours.

5. The method for manufacturing the compound according to claim 4,
    wherein the $H_2Ti_3O_7$ compound is synthesized by subjecting sodium titanium oxide polycrystallines represented by the formula $Na_2Ti_3O_7$ which are formed by treating a mixture of a sodium compound and titanium oxide in air at a high temperature of 600° C. or higher, to a proton exchange reaction in air under room temperature conditions using an acidic solution.

6. A method for manufacturing the active material for a lithium secondary battery described in claim 3,
the method comprising: synthesizing the active material by heat-treating a $H_2Ti_3O_7$ compound which is a starting material in air or in a vacuum within a temperature range of 150° C. to less than 280° C. for 1 to 20 hours.

7. The method for manufacturing the active material for a lithium secondary battery according to claim 6,
wherein the $H_2Ti_3O_7$ compound is synthesized by subjecting sodium titanium oxide polycrystallines represented by the formula $Na_2Ti_3O_7$ which are formed by treating a mixture of a sodium compound and titanium oxide in air at a high temperature of 600° C. or higher, to a proton exchange reaction in air under room temperature conditions using an acidic solution.

8. A lithium secondary battery comprising: two electrodes used as a positive electrode and a negative electrode; and an electrolyte,
wherein the electrode contains an active material which is produced from a compound having a chemical composition represented by the general formula $H_2Ti_{12}O_{25}$, and is used as a constituent thereof.

9. A method for manufacturing the compound described in claim 2,
the method comprising: synthesizing the compound by heat-treating a $H_2Ti_3O_7$ compound which is a starting material in air or in a vacuum within a temperature range of 150° C. to less than 280° C. for 1 to 20 hours.

10. The method for manufacturing the compound according to claim 9,
wherein the $H_2Ti_3O_7$ compound is synthesized by subjecting sodium titanium oxide polycrystallines represented by the formula $Na_2Ti_3O_7$ which are formed by treating a mixture of a sodium compound and titanium oxide in air at a high temperature of 600° C. or higher, to a proton exchange reaction in air under room temperature conditions using an acidic solution.

11. The active material for a lithium secondary battery according to claim 3, wherein the crystal structure of the compound exhibits the monoclinic crystal system with a space group of P2/m and lattice parameters of a=14.81 to 14.83 Å, b=3.88 to 3.90 Å, c=9.85 to 9.88 Å, and β=110 to 112°.

* * * * *